United States Patent
Kasai et al.

(10) Patent No.: US 7,366,505 B2
(45) Date of Patent: Apr. 29, 2008

(54) APPARATUS AND METHOD FOR DELIVERING MESSAGES TO A MOBILE INFORMATION TERMINAL

(75) Inventors: Yasuharu Kasai, Tokyo (JP); Akira Ogawa, Tokyo (JP); Akihiro Iwaya, Tokyo (JP)

(73) Assignee: SAP AG, Walldorf (DE)

( * ) Notice: Subject to any disclaimer, the term of this patent is extended or adjusted under 35 U.S.C. 154(b) by 64 days.

(21) Appl. No.: 11/148,353

(22) Filed: Jun. 9, 2005

(65) Prior Publication Data

US 2006/0009198 A1     Jan. 12, 2006

Related U.S. Application Data

(63) Continuation of application No. 10/950,474, filed on Sep. 28, 2004, now abandoned.

(30) Foreign Application Priority Data

Sep. 30, 2003   (JP)   ............... 2003-342267

(51) Int. Cl.
*H04M 3/00* (2006.01)
*H04M 1/725* (2006.01)
*H04Q 7/20* (2006.01)

(52) U.S. Cl. ............... 455/419; 455/412.1; 455/412.2; 455/466

(58) Field of Classification Search ............... 455/466, 455/412.1, 419, 412.2
See application file for complete search history.

(56) References Cited

U.S. PATENT DOCUMENTS

| | | | |
|---|---|---|---|
| 6,457,046 B1 * | 9/2002 | Munakata | .................... 709/216 |
| 6,507,589 B1 * | 1/2003 | Ramasubramani et al. | . 370/465 |
| 6,742,127 B2 * | 5/2004 | Fox et al. | ...................... 726/10 |
| 6,891,811 B1 * | 5/2005 | Smith et al. | ................. 370/310 |
| 2002/0038337 A1 * | 3/2002 | Satomi et al. | .............. 709/203 |

FOREIGN PATENT DOCUMENTS

| | | |
|---|---|---|
| JP | 2001-242967 | 9/2001 |
| JP | 2002-523924 | 7/2002 |

* cited by examiner

*Primary Examiner*—Barry Taylor
(74) *Attorney, Agent, or Firm*—Finnegan, Henderson, Farabow, Garrett & Dunner

(57) ABSTRACT

A mobile information terminal receives the delivery of a message from a message delivery server that generates messages that indicate identifiers for mobile applications and processing commands executed by the mobile applications. In one embodiment, a mobile service driver receives a message sent from the message delivery server; a push driver control unit receives the message reception notification from the message service driver and notifies message receiving units that have been registered in advance for message notification about the message reception. The message receiving unit notifies relevant mobile applications among the plurality of mobile applications about the received message based on the identifier of the mobile application indicated by the received message, where notification is provided by the push driver control unit.

6 Claims, 2 Drawing Sheets

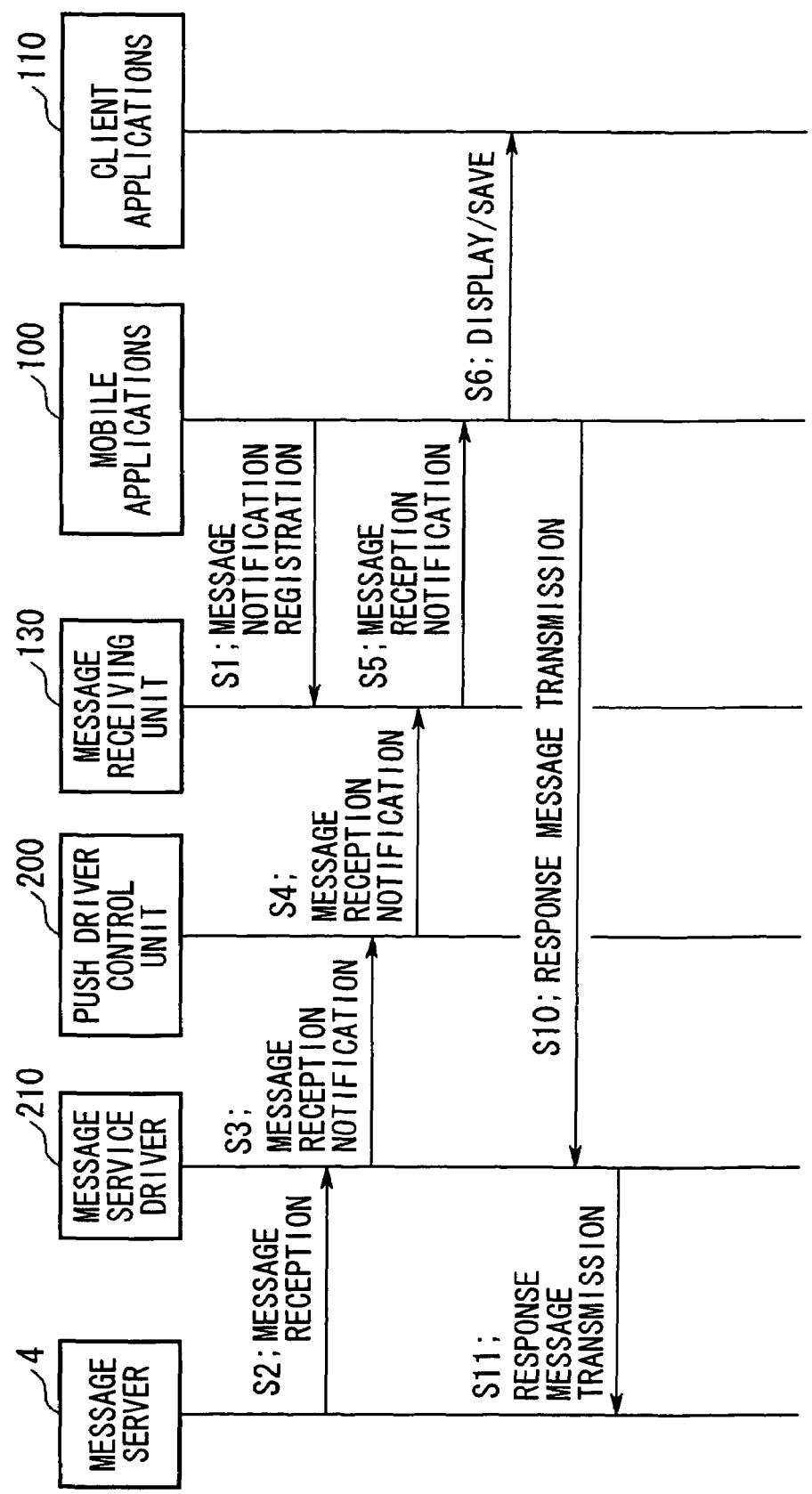

APPARATUS AND METHOD FOR DELIVERING MESSAGES TO A MOBILE INFORMATION TERMINAL

RELATED APPLICATIONS

This is a continuation of Application No. 10/950,474, filed Sep. 28, 2004 now abandoned, which claims priority to Japanese Patent Application Number 2003-342267, filed Sep. 30, 2003, all of which are incorporated herein by reference.

TECHNICAL FIELD

The present invention generally relates to a mobile information terminal, a message delivery method, and message delivery program. More particularly, the present invention relates to techniques for delivering messages to mobile information terminals using push-type message delivery applications.

BACKGROUND

There are conventional technologies that group a plurality of devices on a network and automatically activate them. For example, in Japanese Unexamined Patent Application, First Publication, No. 2001-242967, devices providing soft switches that become activated due to the automatic activation of a power build-up signal or the like are disclosed as devices connected on a network, and a method is disclosed in which the terminal devices having this software that activates the soft switches installed are automatically activated. According to this invention, information is managed that relates to a plurality of devices having a function in which a predetermined device is activated due to reception of a particular signal (activation signal), and when the activation of this device has been detected, the plurality of devices 130 are automatically activated by sending a particular signal to the plurality of devices indicated by the management information.

In addition, Japanese Unexamined Patent Application, First Publication, No. 2002-523924 discloses a method in which an input message is distributed to a plurality of network gateways. According to this invention, an HTTP request and an HTTP response are formed by using a push agent and a pull agent having network drivers for each wireless network carrier, and thereby communication with a wireless terminal is carried out.

In contrast, in recent years, accompanying the diffusion of mobile information terminals such as PDAs, push-type message delivery services for information using these portable information devices are being provided. However, to construct a unique push-type message distribution system, great development costs are incurred, and this is a problem for the introduction of these systems.

SUMMARY

In one aspect of the present invention, a mobile information terminal receives delivery of messages by a message delivery apparatus that generates messages that show an identifier for a mobile application and a processing command that is executed by this mobile application. A message service driver receives a message sent from the message delivery apparatus. A push driver control unit receives the message reception notification from the message service driver and notifies a message receiving unit that has been registered in advance for message notification about the message reception. The message receiving unit notifies the relevant mobile application among a plurality of mobile applications about the received message based on the identifier of the mobile application that the received message indicates, where the push driver control unit provides notification about the received message.

In another aspect, a message delivery method for a mobile application in a mobile information terminal receives the delivery of a message from a message delivery apparatus that generates messages that indicate an identifier for a mobile application and a processing command executed by this mobile application. A message service driver receives a message that has been sent from the message delivery apparatus. A push driver control unit receives the message reception notification from the message service driver and notifies a message receiving unit that has been registered in advance for message notification about the message reception. The message receiving unit notifies the relevant mobile application among a plurality of mobile applications about the received message based on the identifier of the mobile application that the received message indicates, where the push driver control unit provides notification about the received message.

In a further aspect, a computer-readable medium stores a set of instructions for processing message delivery for mobile applications in a mobile information terminal. When executed, the instructions perform stages including a step in which a message service driver receives a message that has been sent from the message delivery apparatus, a step in which a push driver control unit receives a message reception notification from the message service driver and notifies a message receiving unit that has been registered in advance for message notification about the message reception, and a step in which the message receiving unit notifies the relevant mobile application among a plurality of mobile applications about the received message based on the identifier of the mobile application that the received message indicates, where the push driver control unit provides notification about the received message.

As explained above, according to aspects of the present invention, in a mobile information terminal for a mobile application that receives the delivery of a message from the message delivery apparatus that generates messages that indicate an identifier for a mobile application and a processing command executed by this mobile application, the message service driver receives a message that has been sent from the message delivery apparatus, the push driver control unit receives the message reception notification from the message service driver and notifies the message receiving unit that has been registered in advance for message notification about the message reception. The message receiving unit notifies the relevant mobile application among a plurality of mobile applications about the received message based on the identifier of the mobile application that the received message indicates, where the push driver control unit provides notification about the received message.

Therefore, the effect is obtained that the relevant mobile application on the mobile information terminal can receive messages from a message delivery apparatus.

In addition, consistent with aspects of the present invention, preferably the mobile application is activated by receiving a notification of a received message from the message receiving unit, and the processing based on the processing command that the received message indicates is executed.

Thereby, the effect is obtained that even in the case that the mobile application is not activated, a message will be reliably received.

In addition, preferably the push driver control unit receives and temporarily stores message reception notifications from the message service driver and notifies the message receiving unit that has been registered for message notification in advance about the message reception due to a read request from the mobile application.

Thereby, the effect is obtained that even in the case that the message receiving unit is not activated, the message is stored by the driver, and again during activation of the message receiving unit, it is possible to provide notification about the message reliably.

In addition, preferably the push driver control unit receives the message reception notification from the message service driver and records and stores the notification in the message reception notification log.

Thereby, the effect is obtained that it is possible to support bug analysis of the mobile application and message receiving unit by referring to the message reception log from the message service driver.

It is be understood that both the foregoing general description and the following detailed description are exemplary and explanatory only and are not restrictive of the invention, as claimed. The foregoing background and summary are not intended to provide any independent limitations on the claimed invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 2 is a flowchart of the message delivery processing.

DETAILED DESCRIPTION

Figure 1:
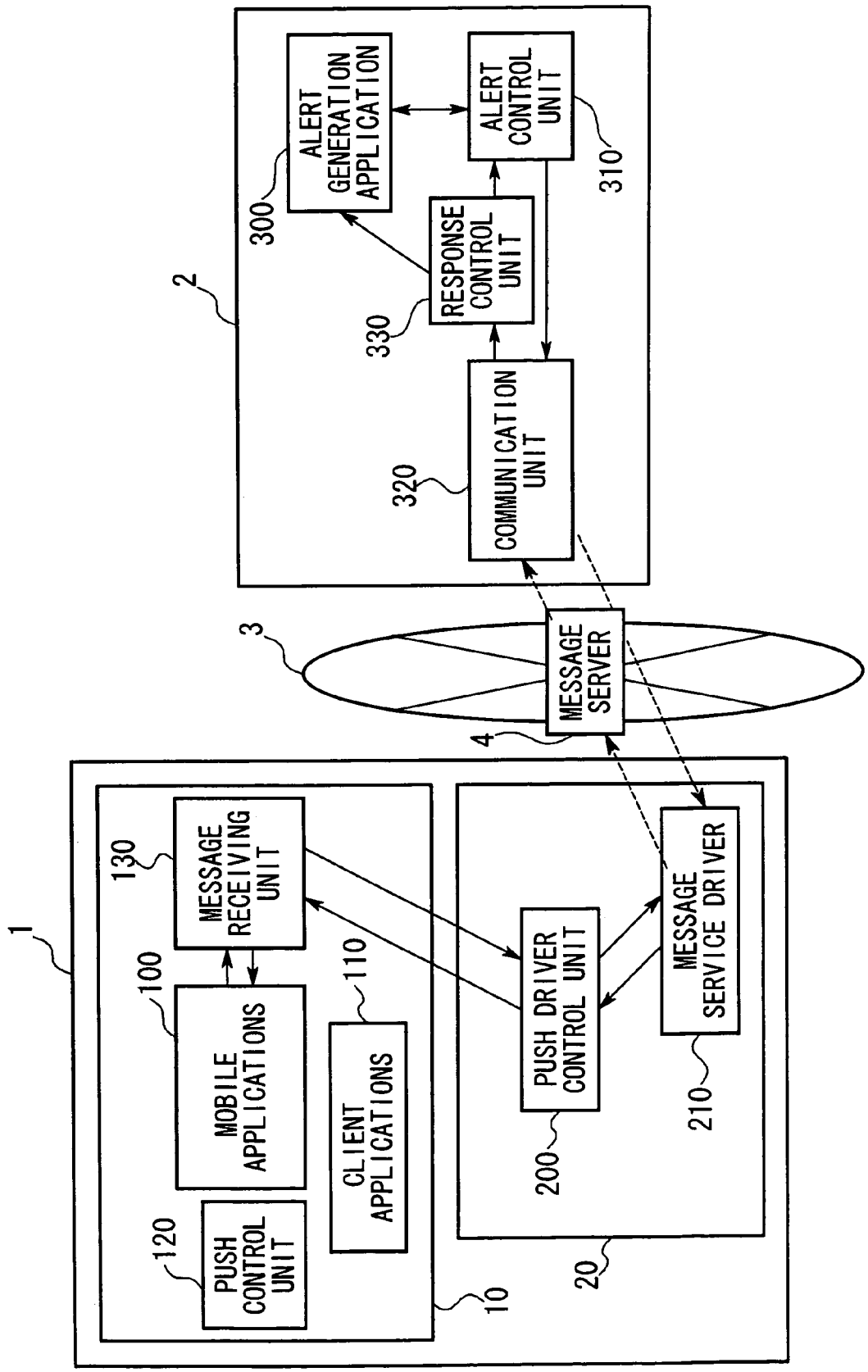
FIG. 1 is a structural drawing of a message delivery system consistent with the principles of the present invention.

The following description refers to the accompanying drawings in which, in the absence of a contrary representation, the same numbers in different drawings represent similar elements. The implementations in the following description do not represent all implementations consistent with principles of the claimed invention. Instead, they are merely some examples of systems and methods consistent with those principles. It is to be understood that both the foregoing general description and the following detailed description are exemplary and explanatory only and are not restrictive of the invention, as claimed.

Below, embodiments of the mobile information terminal consistent with the principles of the present invention will be explained with reference to the figures. FIG. 1 is a comprehensive structural drawing of the push-type message delivery system, which comprises the mobile information terminal 1 and the message delivery server 2 of the present embodiment.

The mobile information terminal 1 of the present embodiment connects to a message delivery server 2 via a message server 4 on a network 3 such as the internet, and receives the delivery of messages. The mobile information terminal 1 is generally formed by a device unit 10 and a driver unit 20.

The device unit 10 has an activation (wake-up) state and a suspended (sleep) state, and is activated or suspended based on an activation control signal from the driver unit 20. The device unit 10 executes a plurality of mobile applications 100 during activation.

The client applications 110 provide the execution environment for the mobile applications 100. Specifically, an application programming interface (API) based on Java (registered trademark) is provided.

Each of the mobile applications 100 is identified by an application ID, receives notification of the received message, and executes the processing command that the received message indicates. This message is received from the message distribution server 2 via the message receiving unit 130. Specifically, the processing command (action command) defines processing, for instance, a process that displays a message (including short messages and business objects), or a process that synchronizes the messages accumulated in the message server 4 and received messages on the mobile information terminal 1.

That is, the format of messages that the message delivery server 2 generates has a form in which the command the application ID, and message are sandwiched by a delimiter.

Note that even in the case that none of the mobile applications 100 is activated at the point in time that the notification about the received message has been received, first the monitoring method that has been registered in advance in each of the mobile applications 100 is started up and due to this monitoring method, each of the mobile applications 100 is started up. Therefore, in this case, after each of the mobile applications 100 is activated by the monitoring method activated after receiving a notification of a received message, each of the mobile applications 100 executes the execution command that the message indicates. This message is received from the message delivery server 2 via the message receiving unit 130.

The push control unit 120 controls the activation, suspension and the like of each of the mobile applications 100. In addition, the message receiving unit 130 is a communication interface between the device unit 10 (each of the mobile applications 100) and the driver unit 20 (push driver control unit 200). Based on the application ID (identifier) of the mobile applications 100 indicated by the received message about which notification has been provided by the push driver control unit 200, among the mobile applications 100, the relevant mobile application 100 is notified about the received message. The received message notification from the push driver control unit 200 to each of the mobile applications 100 is executed in the case that there is a message notification registration from each of the mobile applications 100.

The driver unit 20 outputs the message, which was received from the message server 4 via a wireless network, to the device unit 10. The message service driver 210 corresponds to the receiving unit that receives messages from the message server 4, and it receives messages sent from the message delivery server 2 via the message server 4. There are a plurality of message service drivers 210 in each of the RF interfaces.

The messages that the message service driver 210 receives are output to the push driver control unit 200. Note that in the driver unit 20, the message service driver 210 and the push driver control unit 200 are activated and suspended synchronously.

The push driver control unit 200 receives the message reception notification from the message service driver 210, and as described above, notifies message receiving unit 130 that has registered in advance for message notification about the message reception. At this time, the push driver control unit 200 provides a memory that receives and temporarily stores the message reception notification from the message service driver 210. Next, when the push driver control unit 200 has received a message read request from any of the mobile applications 100, in the same manner as above, the message receiving unit 130 that has been registered in advance for message notification is notified about the message reception. Note that each time the push driver control unit 200 receives a message reception notification from the message service driver 210 the notification is accumulated in a message reception notification log. This message reception notification log is read by the mobile applications 100 and the client applications 110 as necessary, and is used for bug detection during message delivery and the like.

The message delivery server 2 generates messages that indicate the identifier of the mobile applications 100 and processing commands that are executed by the mobile applications 100. As described above, message display and message synchronization are indicated by each of the alert generation applications 300 on the message delivery server 2 as a processing command indicated by the message.

In the case that a message display is indicated as the processing command, the mobile applications 100 display the received message in a display (not illustrated) of the mobile information terminal 1. In addition, in the case that the message synchronism is indicated as the processing command, when a new message is sent to the message server 4, the mobile applications 100 connects to the message server 4 and carries out the download of the relevant message. Below, a message that has been sent is defined in particular as an alert in the case that message synchronization is indicated as a processing command.

The alert control unit 310 executes control in which a message/alert output from an alert generation application 300 is sent to the message server 4 via the communication unit 320. Specifically, the alert control unit 310 determines the message format and outputs the message/alert to the communication unit 320 based on the message transmission protocol that is used.

The communication unit 320 sends the message/alert input from the alert control unit 310 to the message server 4 via the network 3. At the same time, in the case that a response message is received in response to the message delivered from the message server 4, a response message is output to the response control unit 330 from the communication unit 320, and is returned to the alert generation application 300. That is, the response control unit 330 determines the message format and outputs a message/alert to the alert generation application 300 based on the message reception protocol that is used.

Next, referring to the figures, the operation of the mobile information terminal 1 of the present embodiment will be explained. FIG. 2 is a flowchart showing the steps in the message delivery processing between the mobile information terminal 1 and the message server 4.

Before the start of the delivery of a message from the message delivery server 2, in the mobile information terminal 1, the mobile applications 100 carry out message notification registration in the message receiving unit 130 (step S1 in FIG. 2). An application's own ID and classes of monitoring methods corresponding to process commands are examples of registration items. Based on the registration items here, the message receiving unit 130 identifies the mobile application that is to be activated, and outputs the received message.

Specifically, in the alert generation application 300, a message/alert is generated, and the message/alert is sent to the message server 4 by the alert control unit 310.

When the message/alert is received from the message delivery server 2, the message server 4 delivers the received message to the mobile information terminal 1. That is, if the message/alert delivered from the message server 4 is a message/alert that indicated the terminal itself, the message service driver 210 receives this message/alert (step S2), and outputs it to the push-driver control unit 200 (step S3). If the device unit 10 is activated, the push driver control unit 200 outputs the message/alert input message service driver 210 to the message receiving unit 130 (step S4). Note that when the device unit 10 is not activated, the push driver control unit 200 outputs an activation control signal to the device unit 10, and after the device unit 10 has been activated, the message/alert is output to the message receiving In the case that there is a received message notification registration for the mobile application 100, the message receiving unit 130 outputs to the mobile application 100 having the application ID associated with the input message/alert (step S5). In the case that there are a plurality of mobile applications 100 having the associated application ID, similarly, the message receiving unit 130 outputs the input message/alert to all of the mobile applications 100. In the case that there is no mobile application 100 having the corresponding application ID, the message receiving unit 130 does not output the input message/alert.

When the message/alert is input, the mobile applications 100 execute the processing command that the message indicates. For example, in the case of a processing command that displays a message, a mobile application 100 activates the client application 110, such as a browser, and displays the message. In addition, in the case of a processing command that synchronizes a message stored in the message server 4 and a received message in a mobile information terminal 1, the mobile applications 100 activate the client applications 110 for message reception connect to the message server 4, download the received message, and update the message. Then, when the message synchronization has been completed, the mobile applications 100 send a response message to the alert generation application 300 in the message delivery server 2, via the message service driver 210 and the message server 4. Note that the sending destination (response destination) of this response message can be considered to be written into the input message.

Specifically, the mobile applications 100 send a response message, where the response destination indicated by the message serves as the address (steps S 10 and S 11). The message server 4 receives this response message, and notifies the message delivery server 2 about the reception of the response message.

The message delivery server 2 receives this response message via the communication unit 320, and the response control unit 330 outputs the received response message to the alert generation application 300, which is the destination designated by the message.

The alert generation application 300 receives the response message, confirms that the message synchronization processing has completed, and if necessary, executes the next message synchronization process.

As explained above, the mobile information terminal 1 of the present embodiment receives delivery of a message from the message delivery server 2 that generates a message that indicates an identifier for mobile applications 100 and a processing command that is executed by these mobile applications 100. Specifically, the message service driver 210 receives the message sent from the message delivery server 2, the push driver control unit 200 receives the message reception notification from the message service driver 210, and the message receiving unit 130 that is registered in advance for message notification is notified about the message reception. The message receiving unit 130 notifies the relevant mobile applications 100 from among the plurality of mobile applications 100 about the received message base on the identifier of the mobile applications 100 indicated by the received message, where notification has been provided by the push driver control unit 200.

Therefore, the effect is attained that in each of the mobile applications 100, it is possible to receive a message from the message delivery server 2.

Note that in the present embodiment, an example of the case in which the messages are sent and received via a message server 4 is given, but the invention is not limited thereby. A mobile information terminal 1 and a message delivery server 2 may directly transmit and receive messages without the messages passing through the message server 4.

The mobile information terminal 1, message delivery server 2, and the message server 4 have a computer system therein.

In addition, the sequence of processing steps related to the message delivery processing described above can be recorded on a computer readable recording medium in the format of a computer program and this processing carried out by a computer that reads and executes these programs.

That is, each of the processing devices and processing units in the mobile information terminal 1, the message delivery system 2, and the message server 4 can be realized by a central calculating and processing device such as a CPU reading the programs into a main memory device such as ROM or RAM and executing the processing of the information and the calculation processing.

Here, a computer readable recording medium denotes magnetic disks, magneto optical disks, CD-ROMs, DVD-ROMs, semiconductor memory or the like. In addition, the computer programs can be delivered to a computer over a communication line and the computer that has received this delivery can execute these programs.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mobile information terminal comprising:
   a message service driver that receives messages sent from message delivery apparatus that generates messages, wherein the messages indicate identifiers for mobile applications and processing commands that are executed by the mobile applications;
   a push driver control unit that receives a message reception notification from the message service driver; and
   a message receiving unit in which at least one of a plurality of mobile applications has registered in advance for message notification; wherein:
      the push driver control unit notifies the message receiving unit about message reception; and
      the message receiving unit notifies the at least one mobile application about the received message based on the identifier of the at least one mobile application that the message indicates, where notification is provided by the push driver control unit.

2. A mobile information terminal according to claim 1, wherein the at least one mobile application is activated by receiving the notification of the received message from the message receiving unit, and the processing is executed based on the processing command indicated by the message.

3. A mobile information terminal according to claim 1, wherein:
   the push driver control unit receives and temporarily stores the message reception notification from the message service driver, and notifies the message receiving units for message notification about the message reception by a read request from the at least one mobile application.

4. A mobile information terminal according to claim 1 wherein:
   the push driver control unit receives the message reception notification from the message service driver and records the notification in a message reception notification log.

5. A message delivery method for a mobile application in a mobile information terminal, comprising:
   receiving by a message service driver a message sent from a message delivery apparatus that generates messages, wherein the messages indicate identifiers for mobile applications and processing commands that are executed by the mobile applications;
   receiving by a push driver control unit a message reception notification from the message service driver and notifying a message receiving unit in which at least one of a plurality of mobile applications has registered in advance for message notification about message reception; and
   notifying by the message receiving unit the at least one mobile application about the received message from among the plurality of mobile applications based on the identifier of the at least one mobile application indicated by the received message, where notification has been provided by the push driver control unit.

6. A computer-readable storage medium on which is stored a set of instructions for processing message delivery for mobile applications in a mobile information terminal, which instructions when executed perform stages comprising:
   receiving a message sent from a message delivery application that generates messages, wherein the messages indicate identifiers for mobile applications and processing commands executed by the mobile applications;
   receiving the message and notifying a message receiving unit in which at least one of a plurality of mobile applications has registered in advance for message notification about message reception; and
   notifying the at least one mobile application among the plurality of mobile applications about the received message based on the identifier of the mobile application indicated by the received message, where notification has been provided by the message receiving unit.

* * * * *